(12) United States Patent
Masuda

(10) Patent No.: US 9,554,001 B2
(45) Date of Patent: Jan. 24, 2017

(54) INFORMATION PROCESSING APPARATUS, OUTPUT SYSTEM, AND OUTPUT METHOD

(71) Applicant: Masaya Masuda, Kanagawa (JP)

(72) Inventor: Masaya Masuda, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 15/064,692

(22) Filed: Mar. 9, 2016

(65) Prior Publication Data

US 2016/0277596 A1 Sep. 22, 2016

(30) Foreign Application Priority Data

Mar. 18, 2015 (JP) ................................. 2015-054361

(51) Int. Cl.
*G06F 15/00* (2006.01)
*G06F 1/00* (2006.01)
*G06K 1/00* (2006.01)
*H04N 1/00* (2006.01)
*H04N 1/44* (2006.01)
*H04N 1/327* (2006.01)

(52) U.S. Cl.
CPC ........ *H04N 1/0023* (2013.01); *H04N 1/00244* (2013.01); *H04N 1/32771* (2013.01); *H04N 1/444* (2013.01); *H04N 1/4413* (2013.01); *H04N 2201/0094* (2013.01)

(58) Field of Classification Search
CPC H04N 1/0023; H04N 1/00244; H04N 1/4413; H04N 1/444; H04N 1/32771; H04N 2201/0094

USPC ............................... 358/1.1, 1.15, 1.14, 1.13
See application file for complete search history.

(56) References Cited

U.S. PATENT DOCUMENTS

| 8,760,679 B2 | 6/2014 | Watanabe | |
|---|---|---|---|
| 2014/0055809 A1 | 2/2014 | Nishida | |
| 2015/0029538 A1* | 1/2015 | Okamoto | H04N 1/00925 358/1.14 |
| 2015/0103370 A1* | 4/2015 | Takigawa | G06F 3/1267 358/1.14 |

FOREIGN PATENT DOCUMENTS

| JP | 2013-178768 | 9/2013 |
|---|---|---|
| JP | 2014-044546 | 3/2014 |

* cited by examiner

*Primary Examiner* — Douglas Tran
(74) *Attorney, Agent, or Firm* — IPUSA, PLLC

(57) ABSTRACT

An information processing apparatus stores output data in a storage unit, in an output system in which an output device acquires and outputs the output data stored in the storage unit. The information processing apparatus includes a determining unit configured to determine whether a substitute output function should be valid for the output data, based on information read from the output data, by using a substitute output setting including the information that can be read from the output data for which the substitute output function should be valid; and a specifying unit configured to specify a substitute output person, based on information read from the output data, and reflect information of the specified person in output-data-related-information relating to the output data that is stored together with the output data in the storage unit, when it is determined that the substitute output function should be valid for the output data.

15 Claims, 15 Drawing Sheets

FIG.9

1001 TYPE: ROUTINE MEDICAL EXAMINATION

1002 PATIENT NUMBER: 000123

1003 DATE: NOVEMBER 9, 2014

PATIENT NAME: TARO YAMADA

○○ ROUTINE MEDICAL EXAMINATION RESULTS

ISSUING INSTITUTION: ○○ SURGERY

ISSUING PERSON: HANAKO IKEDA

| CONDITION | ACTION |
|---|---|
| TYPE: ROUTINE MEDICAL EXAMINATION | PATIENT IS SUBSTITUTE PRINTING PERSON |
| TYPE: ROUTINE MEDICAL EXAMINATION | ALLOW PRINTING ONLY FOR SUBSTITUTE PRINTING PERSON |
| TYPE: DIETARY RESTRICTION | PATIENT IS SUBSTITUTE PRINTING PERSON |
| TYPE: DIETARY RESTRICTION | ALLOW PRINTING FOR DOCTOR, SUBSTITUTE PRINTING PERSON |
| ... | ... |

FIG.11

| CONDITION | ACTION |
|---|---|
| TYPE: ROUTINE MEDICAL EXAMINATION | PRINT EXPIRATION DATE IS ONE MONTH FROM DATE |
| TYPE: ROUTINE MEDICAL EXAMINATION | UPPER LIMIT OF NUMBER OF PRINTED COPIES IS THREE COPIES |
| ... | ... |

FIG.12

- 1001 — TYPE: ROUTINE MEDICAL EXAMINATION
- 1002 — PATIENT NUMBER: 000123
- 1003 — DATE: NOVEMBER 9, 2014
- PATIENT NAME: TARO YAMADA
- 1005 — UPPER LIMIT OF NUMBER OF PRINTED COPIES: 3 COPIES
- 1004 — PRINT EXPIRATION DATE: JANUARY 5, 2015
- ISSUING INSTITUTION: ○○ SURGERY
- ISSUING PERSON: HANAKO IKEDA

○○ ROUTINE MEDICAL EXAMINATION RESULTS

| USER ID | SUBSTITUTE PRINTING PERSON ID | ONLY SUBSTITUTE PRINTING PERSON CAN PRINT | PRINT SETTING | | |
| --- | --- | --- | --- | --- | --- |
| | | | FILE NAME | PRINT EXPIRATION DATE | UPPER LIMIT NUMBER OF COPIES |
| Doctor_A | Patient_1 | ○ | RESULTS OF ROUTINE MEDICAL EXAMINATION.pdf | 20141209 | 1 |
| Doctor_A | Patient_2 | × | DIETARY RESTRICTION.pdf | 20150601 | 2 |
| Doctor_A | - | × | PERSONAL MATERIALS.doc | - | - |
| Doctor_B | Patient_3 | ○ | RESULTS OF MEDICAL DIAGNOSIS.pdf | 20141213 | 1 |
| ⋮ | ⋮ | ⋮ | ⋮ | ⋮ | ⋮ |

INFORMATION PROCESSING APPARATUS, OUTPUT SYSTEM, AND OUTPUT METHOD

BACKGROUND OF THE INVENTION

1. Field of the Invention

The present invention relates to an information processing apparatus, an output system, and an output method.

2. Description of the Related Art

Conventionally, there is known a technology of storage printing (pull printing), in which a list of print jobs that have been stored in a server device by the user is displayed on an operation screen of a multifunction peripheral (MFP), etc., the user is prompted to select a print job from the list, and the print job selected by the user is caused to be provided from the server device to the multifunction peripheral, etc., and to be printed by the multifunction peripheral, etc. Furthermore, there is conventionally known a technology of substitute printing, in which a user, who requested the printing, delegates the printing authority to another user.

For example, there is a system for handling substitute printing. Substitute printing is to delegate an input print job to another user. In the case of requesting substitute printing, the user specifies the substitute user or group, for requesting the substitute printing, from a printer driver, etc. In this system, a job list is generated, including output jobs input by a user who is identified by user identification information and output jobs with which the user is associated as a shared output person, and the job list is sent to the device executing the output job (see, for example, Patent Document 1).

In the case of performing substitute printing by the conventional system, there is a need to select substitute printing, and to specify another user to which the printing authority is going to be delegated. As described above, in the case of performing substitute printing by the conventional system, the user needs to select substitute printing and specify another to which the printing authority is going to be delegated, and therefore time-consuming efforts are required of the user Note that this problem is not limited to a printing system for performing pull printing; this problem also arises in an output system that outputs a job, which has been stored in a storage destination by a user, from an output device such as a printer, a projector, and a monitor.

Patent Document 1: Japanese Laid-Open Patent Publication No. 2014-44546

SUMMARY OF THE INVENTION

The present invention provides an information processing apparatus, an output system, and an output method, in which one or more of the above-described disadvantages are eliminated.

According to an aspect of the present invention, there is provided an information processing apparatus for storing output data in a storage unit, in an output system in which an output device acquires and outputs the output data stored in the storage unit, the information processing apparatus including a substitute output function validity determining unit configured to determine whether a substitute output function is to be valid for the output data, based on information read from the output data, by using a substitute output setting having set therein the information that can be read from the output data for which the substitute output function is to be valid; and a substitute output person specifying unit configured to specify a substitute output person, based on the information that can be read from the output data, and reflect information of the specified substitute output person in output-data-related-information relating to the output data that is stored together with the output data in the storage unit, when the substitute output function validity determining unit determines that the substitute output function should be valid for the output data.

According to an aspect of the present invention, there is provided an output system including a terminal device configured to send output data to be stored in a storage unit, and at least one information processing apparatus configured to provide, to an output device, the output data sent from the terminal device and stored in the storage unit, and cause the output device to output the output data, the output system including a substitute output function validity determining unit configured to determine whether a substitute output function is to be valid for the output data, based on information read from the output data, by using a substitute output setting having set therein the information that can be read from the output data for which the substitute output function is to be valid; and a substitute output person specifying unit configured to specify a substitute output person, based on the information that can be read from the output data, and reflect information of the specified substitute output person in output-data-related-information relating to the output data that is stored together with the output data in the storage unit, when the substitute output function validity determining unit determines that the substitute output function should be valid for the output data.

According to an aspect of the present invention, there is provided an output method executed in an output system including a terminal device configured to send output data to be stored in a storage unit, and at least one information processing apparatus configured to provide, to an output device, the output data sent from the terminal device and stored in the storage unit, and cause the output device to output the output data, the output method including determining whether a substitute output function is to be valid for the output data, based on information read from the output data, by using a substitute output setting having set therein the information that can be read from the output data for which the substitute output function is to be valid; and specifying a substitute output person, based on the information that can be read from the output data, and reflect information of the specified substitute output person in output-data-related-information relating to the output data that is stored together with the output data in the storage unit, when the determination is made that the substitute output function should be valid for the output data.

BRIEF DESCRIPTION OF THE DRAWINGS

Other objects, features and advantages of the present invention will become more apparent from the following detailed description when read in conjunction with the accompanying drawings, in which:

FIG. 9 is a print image diagram of an example of intermediate print data;

FIG. 10 is a configuration diagram of an example of a substitute printing setting;

FIG. 11 is a configuration diagram of an example of a substitute printing setting for placing a print restriction;

FIG. 12 is a print image diagram of another example of the intermediate print data;

FIG. 13 is a configuration diagram of an example of print job information in which the specification of a substitute printing person and the setting of the print restriction are reflected;

DETAILED DESCRIPTION OF THE PREFERRED EMBODIMENTS

A description is given, with reference to the accompanying drawings, of embodiments of the present invention. Note that in the present embodiment, a printing system is described as an example of an output system; however, the output system is not limited to a printing system. The output system may be a projection system, a display system, and any other system for outputting a job that is stored in a storage destination.

First Embodiment

<System Configuration>

Figure 1:
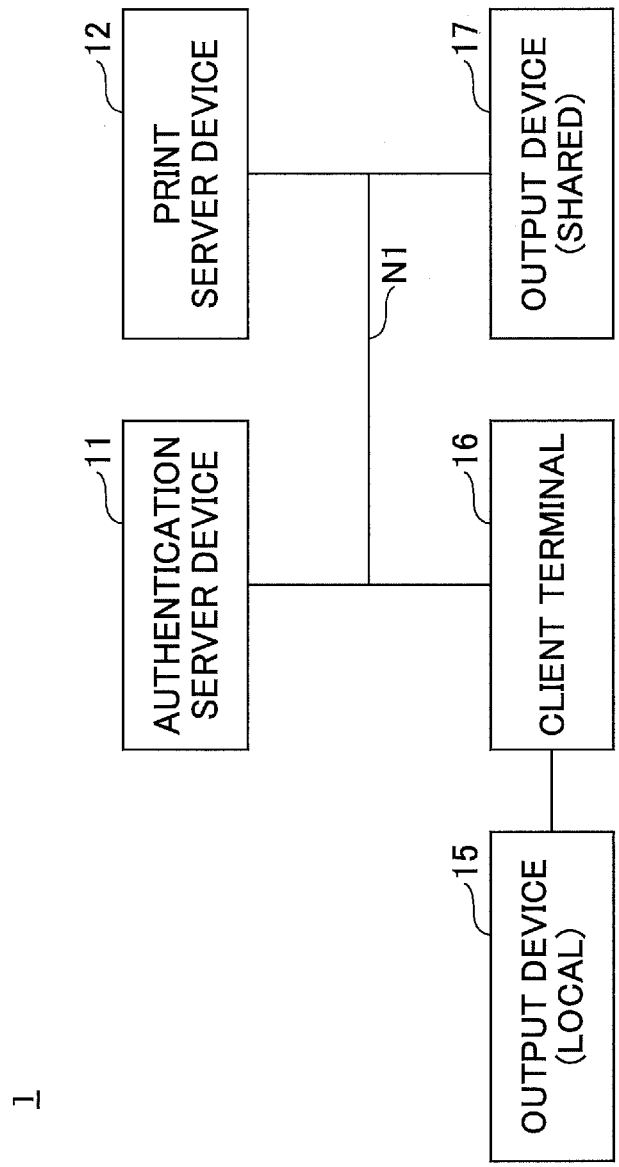
FIG. 1 is a configuration diagram of an example of a printing system according to an embodiment.

FIG. 1 is a configuration diagram of an example of a printing system according to the present embodiment. A printing system 1 illustrated in FIG. 1 includes an authentication server device 11, a print server device 12, a client terminal 16, and a shared output device 17, which are connected via a network N1 such as a LAN. Furthermore, the printing system 1 includes a local output device 15 that is connected to the client terminal 16.

The authentication server device 11, the print server device 12, the local output device 15, the client terminal 16, and the shared output device 17 include a wired or wireless communication unit. Note that FIG. 1 illustrates an example where there is one of each of the authentication server device 11, the print server device 12, the local output device 15, the client terminal 16, and the shared output device 17; however there may be a plurality of each of these devices.

The authentication server device 11 is realized by one or more information processing apparatuses. The authentication server device 11 holds user information and group information, and performs authentication based on a request from the client terminal 16, the output device 17, etc.

The print server device 12 is realized by one or more information processing apparatuses. The print server device 12 stores print data and print job information. The print server device 12 sends a job list, print data, and print job information to the output device 17, etc., based on a request from the output device 17, etc.

The print server device 12 is an example of a data storage device for storing output data such as print data, etc., and output-data-related-information such as information relevant to the output data such as print job information, etc., and sending this data to the output device 17, etc.

For example, when the output device 17 is a projector, the print server device 12 stores output data (projection data) to be output by displaying (projecting) with the use of the projector. Furthermore, the print server device 12 may store a setting (output-data-related-information) such as the display method, etc., to be performed when executing display output.

The output device 15 is an image forming apparatus, etc., such as a printer, etc., directly connected to the client terminal 16 by wired or wireless communication. The output device 15 may be an image forming apparatus such as a printer, a copier, a multifunction peripheral, a laser printer, etc.; a projection device or a display device for executing display output such as a projector, a monitor, etc.; a voice sound output device for outputting voice sound data such as an audio instrument, etc.

The client terminal 16 is an information processing apparatus such as a PC, etc., which is used by the user. The client terminal 16 is a terminal device such as a smartphone, a mobile phone, a PC, etc. The output device 17 is an image forming apparatus, etc., such as a printer, etc., connected to the network N1 by wired or wireless communication. The output device 17 may be an image forming apparatus such as a printer, a copier, a multifunction peripheral, a laser printer, etc.; a projection device or a display device for executing display output such as a projector, a monitor, etc.; a voice sound output device for outputting voice sound data such as an audio instrument, etc.

Note that the printing system 1 of FIG. 1 is one example; the system may have a configuration in which the functions of the authentication server device 11 and the print server device 12 are realized by a single device.

<Hardware Configuration>

Figure 2:
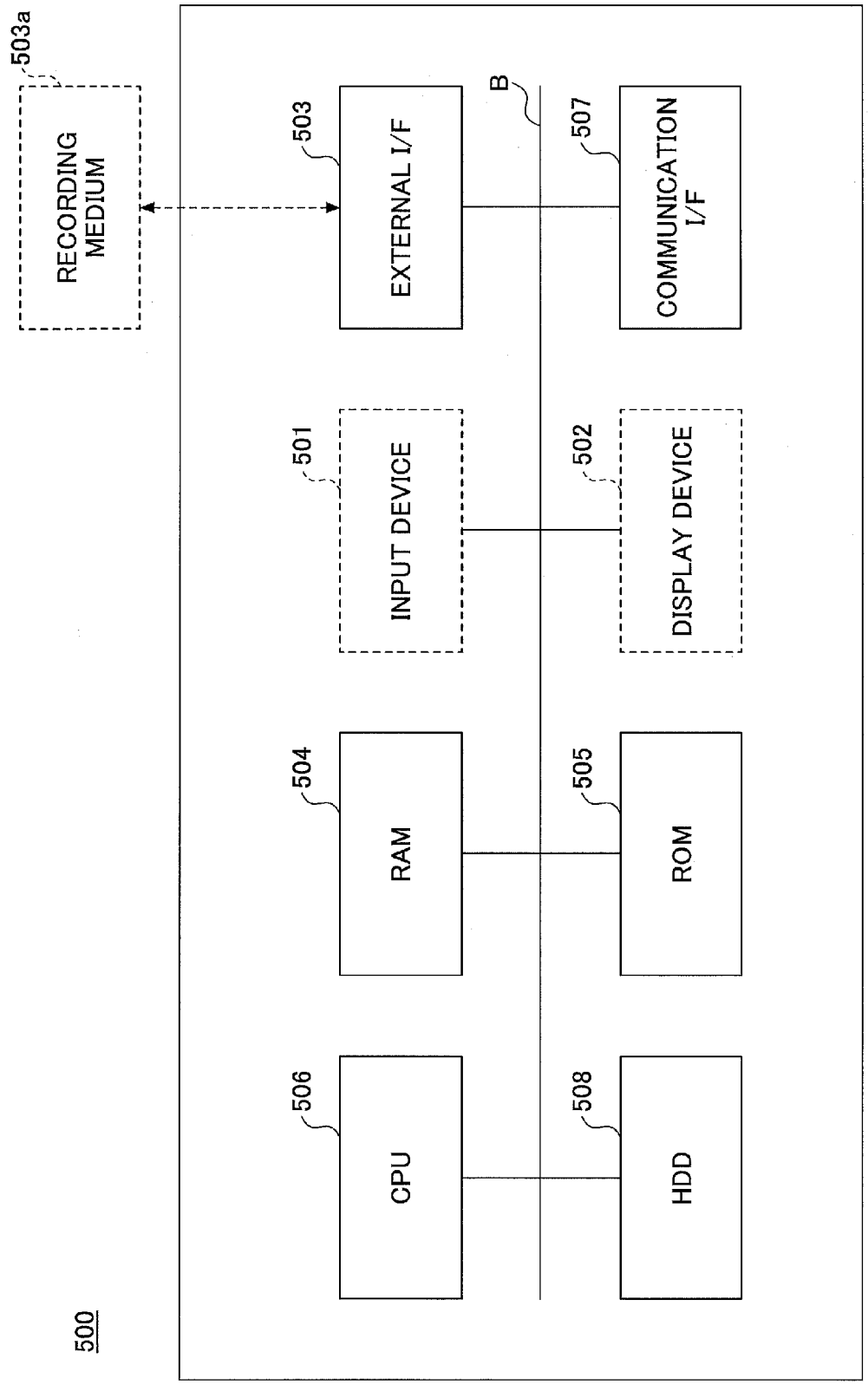
FIG. 2 illustrates a hardware configuration of an example of a computer according to an embodiment.

The authentication server device 11, the print server device 12, and the client terminal 16 illustrated in FIG. 1 are realized by, for example, a computer having a hardware configuration illustrated in FIG. 2. FIG. 2 illustrates a hardware configuration of an example of a computer according to the present embodiment.

A computer 500 illustrated in FIG. 2 includes an input device 501, a display device 502, an external I/F 503, a RAM 504, a ROM 505, a CPU 506, a communication I/F 507, and a HDD 508, which are interconnected by a bus B. Note that the input device 501 and the display device 502 may have a configuration of being connected and used when necessary.

The input device 501 includes a keyboard, a mouse, and a touch panel, and is used by the user for inputting various operation signals. The display device 502 includes a display, etc., and displays processing results obtained by the computer 500.

The communication I/F 507 is an interface that connects the computer 500 to a network N1. Accordingly, the computer 500 is able to perform data communication via the communication I/F 507.

Furthermore, the HDD 508 is an example of a non-volatile storage device for storing programs and data. The stored programs and data include an OS that is the basic software for controlling the entire computer 500, and application software (hereinafter, simply referred to as "application") for providing various functions in the OS. Note that the computer 500 may use a drive device (for example, a solid state drive: SSD) using a flash memory as the storage medium, instead of the HDD 508.

The external I/F 503 is an interface between the computer 500 and an external device. An example of the external device is a recording medium 503a. Accordingly, the computer 500 is able to read and/or write in the recording medium 503a via the external I/F 503. Examples of the recording medium 503a are a flexible disk, a CD, a DVD, an SD memory card, and a USB memory.

The ROM 505 is an example of a non-volatile semiconductor memory (storage device) that can store programs and data even after the power is turned off. The ROM 505 stores programs and data such as a BIOS that is executed when the computer 500 is activated, OS settings, and network settings. The RAM 504 is an example of a volatile semiconductor memory (storage device) for temporarily storing programs and data.

The CPU 506 is a processor for controlling the entire computer 500 and realizing functions of the computer 500, by loading the programs and data from the storage devices such as the ROM 505 and the HDD 508, into the RAM 504, and executing processes. The authentication server device 11, the print server device 12, and the client terminal 16 according to the present embodiment are able to realize various processes described below, by the hardware configuration of the computer 500 described above.

<Software Configuration>

<<Client Terminal>>

Figure 3:
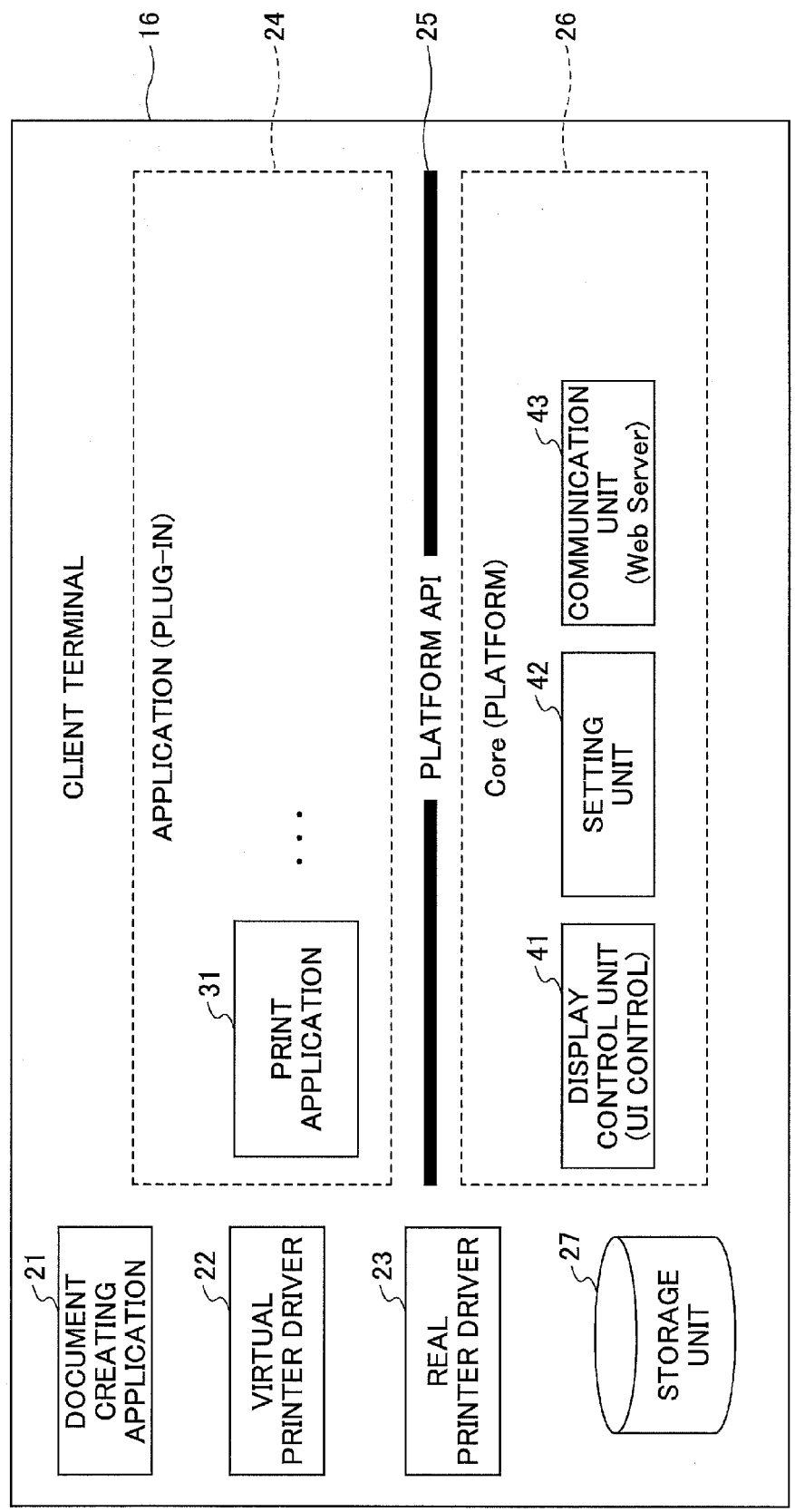
FIG. 3 is a process block diagram of an example of a client terminal according to an embodiment.

The client terminal 16 according to the present embodiment is realized by, for example, the process blocks illustrated in FIG. 3. FIG. 3 is a process block diagram of an example of the client terminal 16 according to the present embodiment.

The client terminal 16 illustrated in FIG. 3 realizes a document creating application 21, a virtual printer driver 22, a real printer driver 23, a plug-in 24, a platform API 25, a platform 26, and a storage unit 27, by executing programs.

In the plug-in 24, one or more applications can be installed. In FIG. 3, a print application 31 is installed. The platform 26 includes a display control (UI control) unit 41, a setting unit 42, and a communication unit 43. The document creating application 21 is an example of an application for receiving a request for printing from the user. The document creating application 21 is one example; any application is applicable as long as a request for output, such as printing, can be received from the user.

The virtual printer driver 22 is a printer driver for converting the application data into intermediate print data that is not dependent on the model, and outputting the converted data. Note that the intermediate print data is print data that is not dependent on the model of the output device 17, etc. Data in the XPS (XML Paper Specification) format is an example of intermediate print data. Furthermore, application data is an example of output target data. In FIG. 3, the virtual printer driver 22 functions as a printer driver for using the print application 31.

The real printer driver 23 is a printer driver for converting the intermediate print data into real print data in a format that can be printed by the output device 15 or the output device 17. Data in a RAW format is an example of real print data.

Furthermore, the print application 31 is software that operates on the platform 26. The print application 31 can use functions of the platform 26, by using the platform API 25.

The platform API 25 is an interface for the print application 31 to use functions of the platform 26. The platform API 25 is an interface that is defined in advance and provided for the platform 26 to receive a request from the print application 31, and the platform 26 is formed of, for example, a function, a class, etc.

The display control unit 41 of the platform 26 controls the display of the display device 502, based on a request from, for example, the document creating application 21, the print application 31, etc. The setting unit 42 sets the print application 31. The communication unit 43 executes communication with the authentication server device 11, the print server device 12, etc. The storage unit 27 stores settings, etc.

The client terminal 16 integrates the processes, by integrating the functions commonly used by the plug-in 24 with the platform 26. Note that the classification form of the process block diagram of FIG. 3 is one example; it is not essential that the process blocks are classified into the hierarchies as illustrated in FIG. 3.

Figure 4:
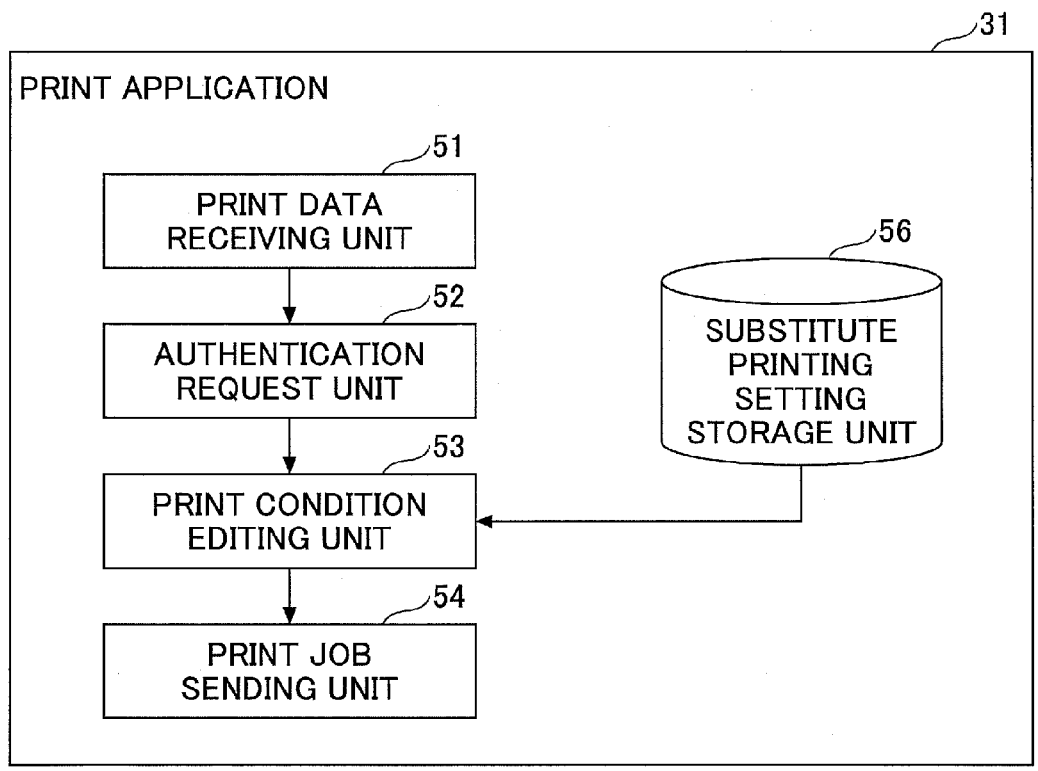
FIG. 4 is a process block diagram of an example of a print application.

The print application 31 of the client terminal 16 is realized by, for example, the process blocks illustrated in in FIG. 4. FIG. 4 is a process block diagram of an example of the print application 31.

The print application 31 illustrated in FIG. 4 includes a print data receiving unit 51, an authentication request unit 52, a print condition editing unit 53, a print job sending unit 54, and a substitute printing setting storage unit 56. The print data receiving unit 51 receives print data of application data, for which a request for printing has been made by the user. The authentication request unit 52 causes the display device 502 to display an authentication dialog for receiving input of user information such as a user name, a password, etc., from the user, when the print data receiving unit 51 receives print data. Then, the authentication request unit 52 requests the authentication server device 11 to perform authentication by the user information input in the authentication dialog.

When the authentication is successful, the print condition editing unit 53 performs a print condition editing process by using the substitute printing setting stored in the substitute printing setting storage unit 56. In the print condition editing process, the print condition editing unit 53 determines whether the substitute printing function is valid or invalid from the information that can be read from the print data. When the substitute printing function is valid, the print condition editing unit 53 specifies the substitute printing person and sets the print restriction (expiration date, number of copies, etc.). The specification of the substitute printing person and the setting of the print restriction are reflected in the print job information.

Furthermore, the print job sending unit 54 uploads a print job including the print data and the print job information, in the print server device 12. The substitute printing setting storage unit 56 stores a substitute printing setting.

<<Authentication Server Device>>

Figure 5:
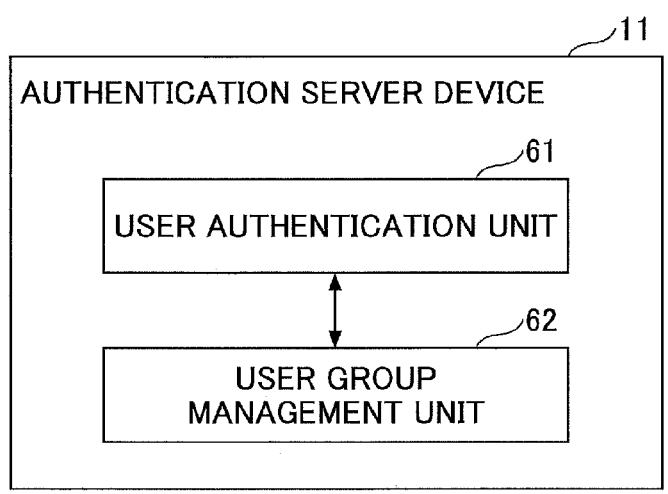
FIG. 5 is a process block diagram of an example of an authentication server device according to an embodiment.

The authentication server device 11 according to the present embodiment is realized by, for example, the process blocks illustrated in in FIG. 5. FIG. 5 is a process block diagram of an example of the authentication server device 11 according to the present embodiment.

The authentication server device 11 illustrated in FIG. 5 realizes a user authentication unit 61 and a user group management unit 62 by executing programs. The user authentication unit 61 performs the authentication of the user information requested from the client terminal 16 or the output device 17, by using user information and group information managed by the user group management unit 62, and returns an authentication result. The user group management unit 62 manages user information and group information necessary for the authentication performed by the user authentication unit 61.

<<Print Server Device>>

Figure 6:
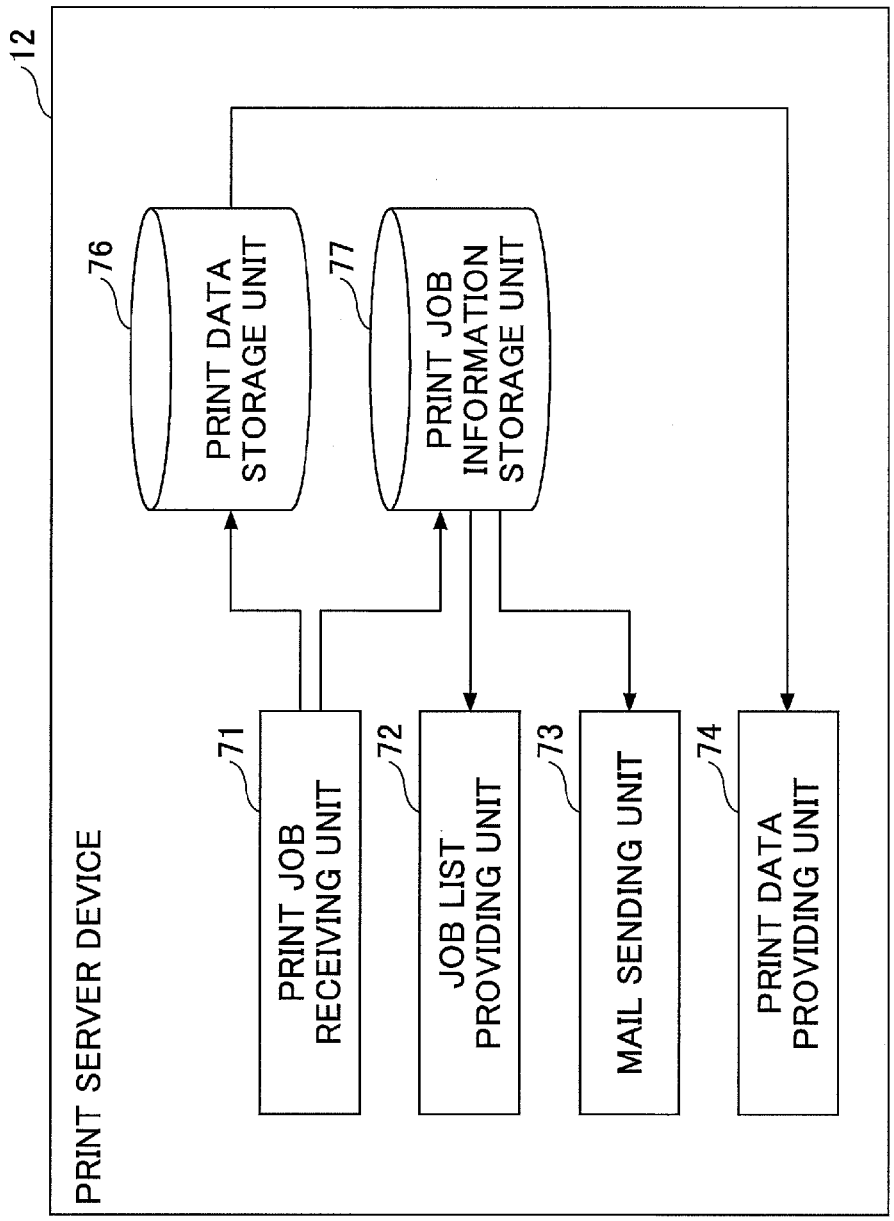
FIG. 6 is a process block diagram of an example of a print server device according to an embodiment.

The print server device 12 according to the present embodiment is realized by, for example, the process blocks illustrated in in FIG. 6. FIG. 6 is a process block diagram of an example of the print server device 12 according to the present embodiment. The print server device 12 illustrated in FIG. 6 realizes a print job receiving unit 71, a job list providing unit 72, a mail sending unit 73, a print data providing unit 74, a print data storage unit 76, and a print job information storage unit 77, by executing programs.

The print job receiving unit 71 receives a print job uploaded from the client terminal 16. The print job receiving unit 71 causes the print data storage unit 76 to store the print data of the received print job. Furthermore, the print job receiving unit 71 causes the print job information storage unit 77 to store the print job information of the received print job.

The job list providing unit 72 provides a job list of print jobs that the requesting user can print, to the output device 17. The mail sending unit 73 sends a report by mail to a registered user of a print job printed by a substitute printing person, and sends a report by mail to a substitute printing person of a print job of which the print expiration date is about to expire. The print data providing unit 74 provides print data of a print job selected from a job list by the requesting user, to the output device 17. The print data storage unit 76 stores print data. The print job information storage unit 77 stores print job information.

<Details of Process>

In the following, a description is given of details of a process by the printing system 1 according to the present embodiment. Note that in the present embodiment, a description is given of an example of substitute printing, in which a doctor delegates the printing authority to a patient, and the patient performs the printing.

<<Print Job Storage>>

Figure 7:
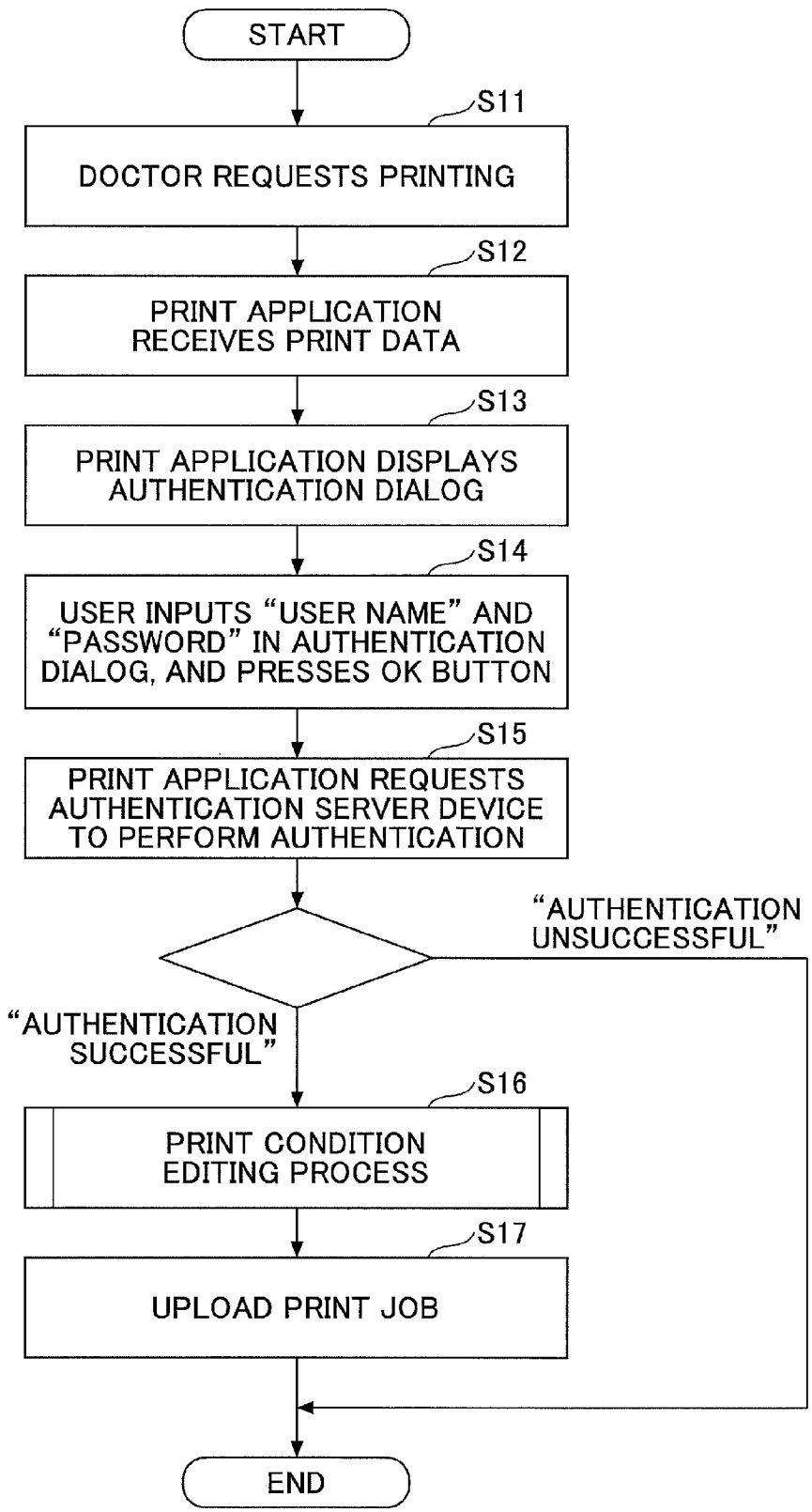
FIG. 7 is as flowchart of an example of a print job storage process according to an embodiment.

FIG. 7 is as flowchart of an example of a print job storage process according to the present embodiment. In step S11, the doctor can start the print job storage process by operating the document creating application 21, selecting the virtual printer driver 22 of the print application 31, and requesting printing.

The document creating application 21 reports a print event to the virtual printer driver 22 selected by the doctor. The virtual printer driver 22 converts the application data into intermediate print data, and reports the print event to the print application 31.

In step S12, the print data receiving unit 51 of the print application 31 receives the intermediate print data of the reported print event. In step S13, the authentication request unit 52 displays, on the display device 502, an authentication dialog for receiving input of user information such as a user name, a password, etc., from the doctor.

In step S14, the authentication request unit 52 receives input of user information to the authentication dialog from the doctor. In step S15, the authentication request unit 52 requests the authentication server device 11 to perform authentication by the user information received from the doctor, and receives the authentication result.

Figure 8:
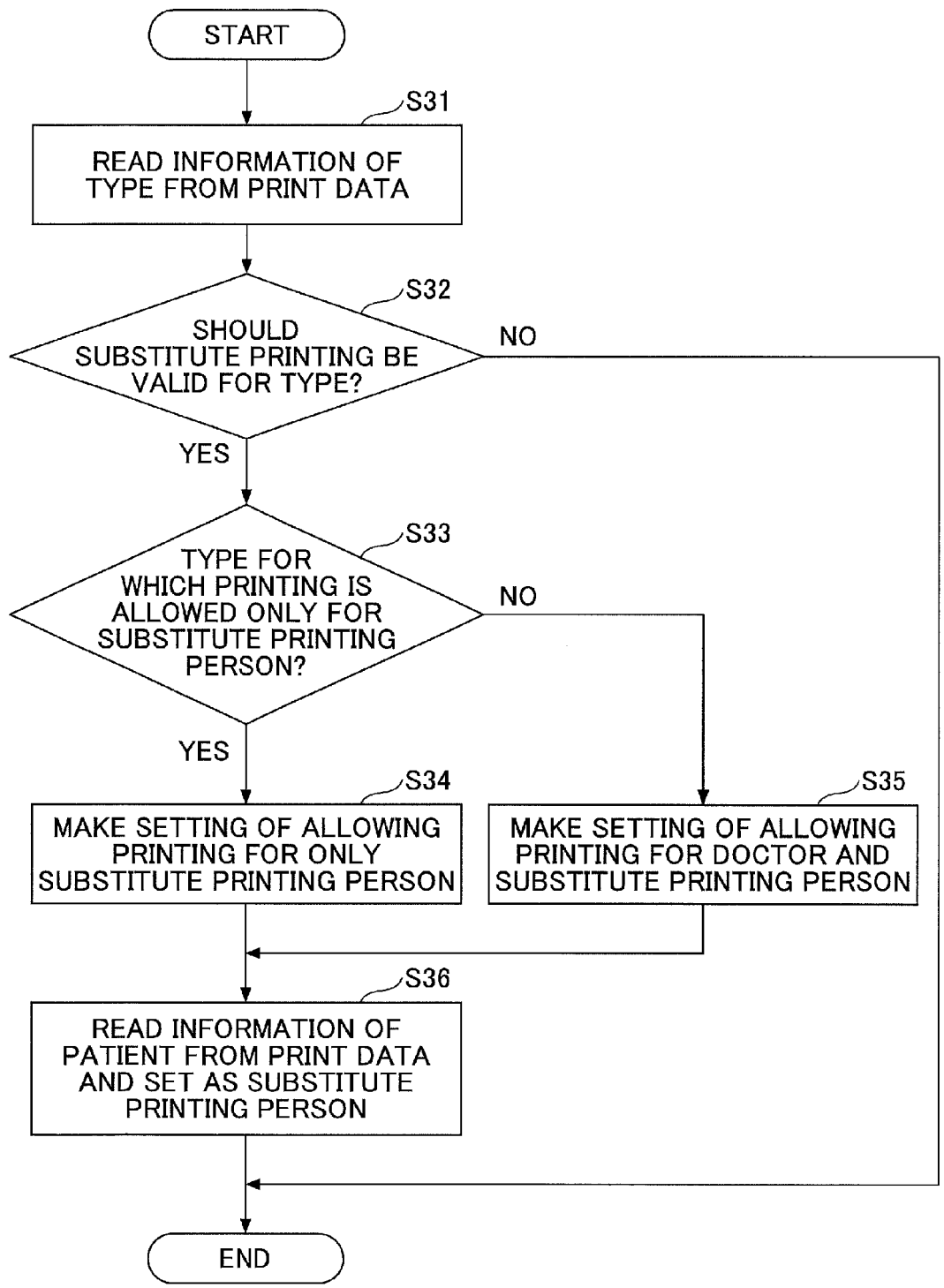
FIG. 8 is as flowchart of an example of a print condition editing process according to an embodiment.

When the authentication result is authentication successful, the print condition editing unit 53 proceeds to step S16, and performs the printing condition editing process as illustrated in the flowchart of FIG. 8, by using the substitute printing setting stored in the substitute printing setting storage unit 56. Subsequently, the print job sending unit 54 uploads, in the print server device 12, the print job including print data and print job information. Note that when the authentication result is authentication unsuccessful, the print job sending unit 54 ends the process of FIG. 7 without uploading the print job in the print server device 12.

FIG. 8 is as flowchart of an example of a print condition editing process according to the present embodiment. In step S31, the print condition editing unit 53 reads the information of "type", from the intermediate print data. FIG. 9 is a print image diagram of an example of the intermediate print data.

The print image of FIG. 9 is an example of a standard format. In a print image 1000 of FIG. 9, a type field 1001, a patient number field 1002, and a date field 1003 are provided at predetermined positions. The print condition editing unit 53 can read the information of the type from the type field 1001, the patient number from the patient number field 1002, and the date from the date field 1003.

In step S32, the print condition editing unit 53 uses the information of the type read from the type field 1001 and the substitute printing setting stored in the substitute printing setting storage unit 56, to determine whether the substitute printing function should be valid for the type.

FIG. 10 is a configuration diagram of an example of the substitute printing setting. The substitute printing setting in FIG. 10 is expressed by combinations of conditions and actions. When the type read from the type field 1001 is set as a condition corresponding to the action "patient is substitute printing person", the print condition editing unit 53 determines that the substitute printing function should be valid for the type that is read.

For example, in the case of the print image 1000 of FIG. 9, the type "routine medical examination" is set as a condition corresponding to the action "patient is substitute printing person" in the substitute printing setting of FIG. 10, and therefore the print condition editing unit 53 determines that the substitute printing function should be valid for this type.

When the print condition editing unit 53 determines that the substitute printing function should not be valid for the type, the print condition editing unit 53 ends the process of the flowchart of FIG. 8, without making settings relevant to substitute printing. Therefore, in step S17 of FIG. 7, the print job sending unit 54 uploads the print job for which settings relevant to substitute printing are not made, in the print server device 12.

On the other hand, when the print condition editing unit 53 determines that the substitute printing function should be valid for the type, the print condition editing unit 53 proceeds to step S33, and determines whether the type read from the type field 1001 is a type for which printing is allowed only for the substitute printing person.

When the type read from the type field 1001 is set as a condition corresponding to the action "allow printing only for substitute printing person", the print condition editing unit 53 determines that printing of this type is only allowed for the substitute printing person. Furthermore, when the type read from the type field 1001 is set as a condition corresponding to the action "allow printing for doctor, substitute printing person", the print condition editing unit 53 determines that printing of this type is not only allowed for the substitute printing person.

For example, in the case of the substitute printing setting of FIG. 10, a type "routine medical examination" read from the type field 1001 is set as a condition corresponding to the action "allow printing only for substitute printing person", and therefore the print condition editing unit 53 determines that printing of this type is only allowed for the substitute printing person.

When the print condition editing unit 53 determines that printing of the type is only allowed for the substitute printing person, the print condition editing unit 53 proceeds to step S34, and the print condition editing unit 53 makes a setting of allowing printing only for the substitute printing person. Therefore, a doctor who requests printing will not be allowed to perform printing.

When the print condition editing unit 53 determines that printing of the type is not only allowed for the substitute printing person, the print condition editing unit 53 proceeds to step S35, and the print condition editing unit 53 makes a setting of allowing printing for the doctor and the substitute printing person. Therefore, the doctor who requests printing will be allowed to perform printing.

After step S34 or S35, the print condition editing unit 53 proceeds to step S36, and the print condition editing unit 53 reads information of the patient from the intermediate print data and sets the patient as the substitute printing person. For example, in the case of the print image 1000 of FIG. 9, the print condition editing unit 53 reads the patient number from the patient number field 1002, and sets the patient corresponding to the patient number as the substitute printing person.

Note that the substitute printing person specified by the process of the flowchart of FIG. 8, the setting of allowing printing only for the substitute printing person, the setting of allowing printing for the doctor and the substitute printing person, etc., are uploaded in the print server device 12 by being reflected in the print job information.

Furthermore, the print application 31 according to the present embodiment can also set the print restriction on the printing by the substitute printing person, such as the print expiration date and the upper limit of the number of printed copies, by adding a substitute printing setting as illustrated in FIG. 11.

FIG. 11 is a configuration diagram of an example of a substitute printing setting for placing a print restriction. Similar to the substitute printing setting of FIG. 10, the substitute printing setting of FIG. 11 is also expressed by combinations of conditions and actions. When the type read from the type field 1001 is set as a condition corresponding to the action "print expiration date is one month from date", the print condition editing unit 53 sets the print expiration date. For example, the print expiration date set to be one month from the date read from the date field 1003.

Furthermore, when the type read from the type field 1001 is set as a condition corresponding to the action "upper limit of number of printed copies is three copies", the print condition editing unit 53 sets three copies as the upper limit of the number of printed copies that can be printed by the substitute printing person.

Note that the print application 31 according to the present embodiment may also read information of print restrictions such as the print expiration date, the upper limit of the number of printed copies, etc., from the print image 1000 as illustrated in FIG. 12, other than the setting of print restrictions according to the substitute printing setting as illustrated in FIG. 11.

FIG. 12 is a print image diagram of another example of the intermediate print data. In the print image 1000 of FIG. 12, a print expiration date field 1004 and an upper limit of number of printed copies field 1005 are provided in addition to the print image 1000 of FIG. 9. The print condition editing unit 53 can read the print expiration date from the print expiration date field 1004, and can read the upper limit of the number of printed copies from the upper limit of number of printed copies field 1005.

FIG. 13 is a configuration diagram of an example of print job information in which the specification of a substitute printing person and the setting of the print restriction are reflected. The print job information of FIG. 13 includes a user ID, a substitute printing person ID, information indicating whether to allow printing only for the substitute printing person, the printing setting, etc.

The user ID is a user ID indicating the doctor who requested printing. The substitute printing person ID is user ID indicating a user such as patient, who is specified as the substitute printing person. Note that a print job, which does not have a user ID set as the substitute printing person ID, is not a print job of substitute printing.

The information indicating whether to allow printing only for the substitute printing person, is information indicating whether to allow printing for the doctor who requested the printing. When the information indicating whether to allow printing only for the substitute printing person is "O", printing is not allowed for the doctor who requested the printing. When the information indicating whether to allow printing only for the substitute printing person is "x", printing is allowed for the doctor who requested the printing.

The printing setting includes a file name, a print expiration date, and a upper limit number of copies. As the print expiration date, the expiration date of printing by the substitute printing person is set. As the upper limit number of copies, the upper limit of the number of printed copies that can be printed by the substitute printing person is set.

<<Providing Job List>>

For example, the user who for which authentication is successful at the output device 17, can request the print server device 12 to provide a job list of print jobs that the user himself can print. The print server device 12, which has received the request for a job list from the user who for which authentication is successful (requesting user), performs a job list providing process illustrated in FIG. 14, for example.

Figure 14:
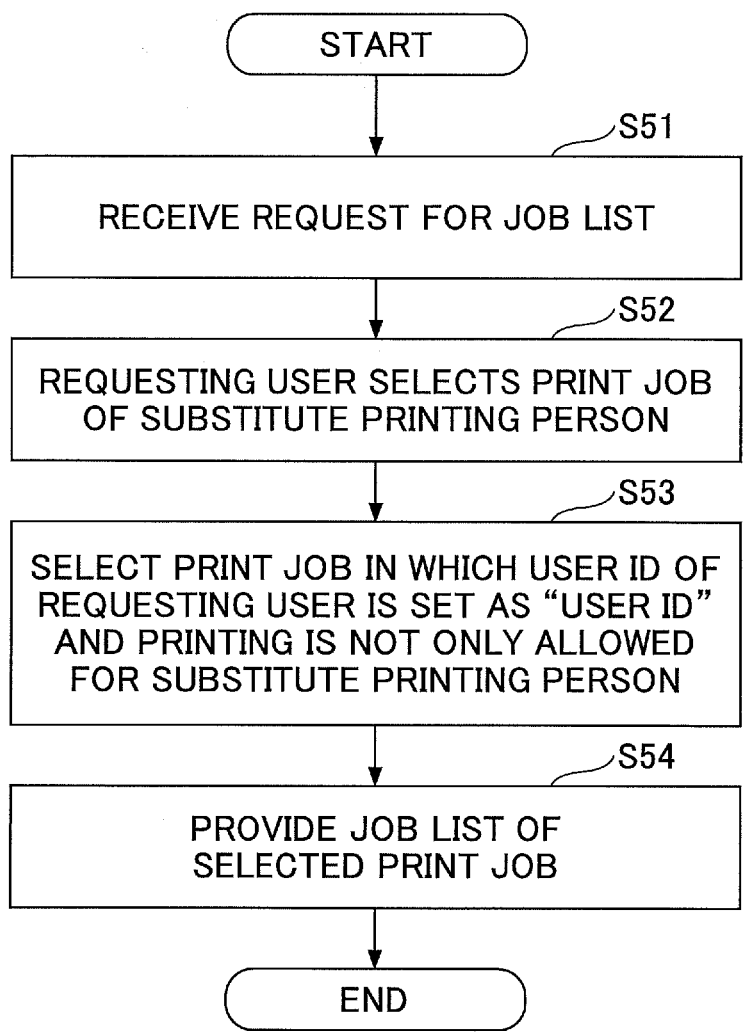
FIG. 14 is a flowchart of an example of a job list providing process.

FIG. 14 is a flowchart of an example of a job list providing process. In step S51, the job list providing unit 72 of the print server device 12 receives a request for a job list of print jobs that the requesting user can print, from the output device 17.

In step S52, the job list providing unit 72 refers to the print job information illustrated in FIG. 13, and selects a print job in which the user ID of the requesting user is set as the substitute printing person ID.

Furthermore, in step S53, the job list providing unit 72 refers to the print job information illustrated in FIG. 13, and selects a print job, in which the user ID of the requesting user is set as the "user ID", and the information indicating whether to allow printing only for the substitute printing person is "x". The process of step S53 is for selecting a print job for which printing is also allowed for the doctor who requested the printing, among the print jobs that the requesting user himself requested printing.

In step S54, the job list providing unit 72 provides a job list of print jobs selected in steps S52 and S53 to the output device 17 that is the request source of the job list, and causes the output device 17 to display the job list of print jobs that the requesting user can print.

Note that when printing is executed at the output device 17 by the substitute printing person, the mail sending unit 73 of the print server device 12 refers to the print job information of FIG. 13, and sends a report by mail to the doctor who requested the printing. Furthermore, the mail sending unit 73 refers to the print job information of FIG. 13, and sends a report by mail to the substitute printing person of a print job for which the print expiration date is approaching in a predetermined number of days (for example, one day).

Another Embodiment

Figure 15:
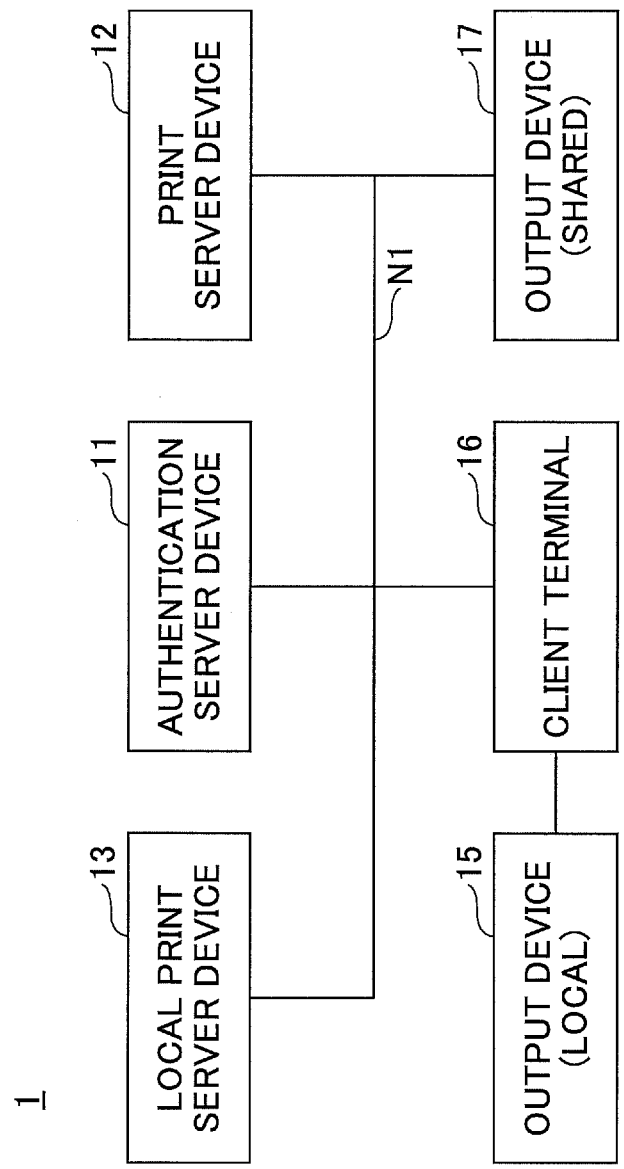
FIG. 15 is a configuration diagram of another example of a printing system according to an embodiment.

FIG. 15 is a configuration diagram of another example of a printing system according to the present embodiment. In the printing system 1 of FIG. 15, a local print server device 13 is added to the printing system 1 of FIG. 1.

The local print server device 13 is determined to be the upload destination of a print job, in a case where it is determined that the substitute printing function should not be valid for the corresponding type. In the printing system 1 of FIG. 15, for example, the print server device 12 is set in a public network, and the print server device 12 is used a shared device that is shared by the doctor and the patients. Furthermore, in the printing system 1 of FIG. 15, for example, the local print server device 13 is set in a private network, and the local print server device 13 is used as an exclusive-use device that is exclusively used by the hospital staff such as the doctor.

Furthermore, in the first embodiment, a description is given of an example in which the client terminal 16 performs the print condition editing process; however, the print server device 12 may perform the print condition editing process. When the print server device 12 performs the print condition editing process, as illustrated in FIG. 16, the print application 31 of the client terminal 16 has a configuration in which the print condition editing unit 53 and the substitute printing setting storage unit 56 are deleted from the print application 31 of FIG. 4.

Figure 17:
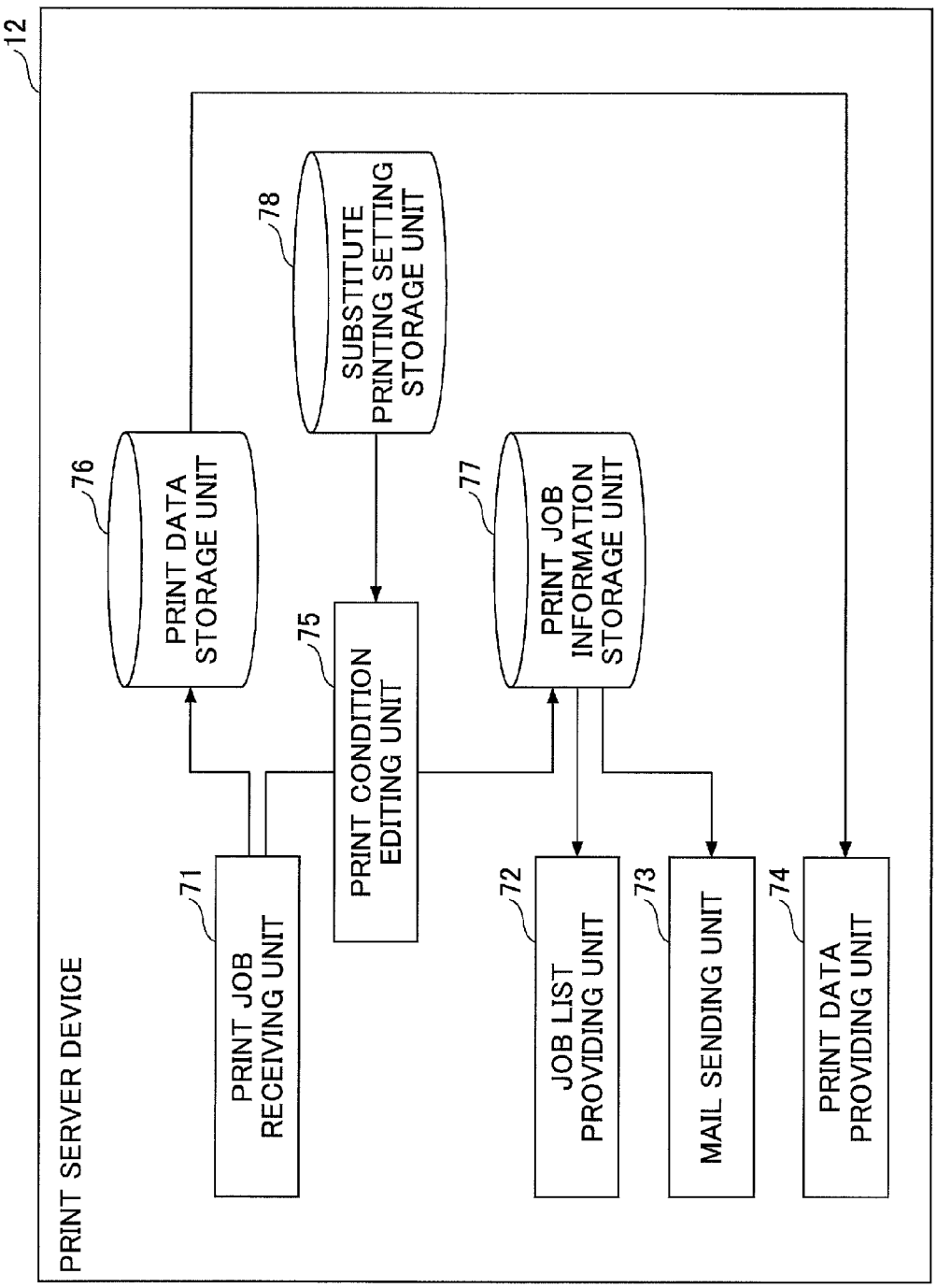
FIG. 17 is a process block diagram of another example of a print server device.

Furthermore, when the print server device 12 performs the print condition editing process, as illustrated in FIG. 17, the print server device 12 has a configuration in which a print condition editing unit 75 and a substitute printing setting storage unit 78 are added to the configuration of the print server device 12 of FIG. 6. The print condition editing unit 75 performs the print condition editing process by using the substitute printing setting stored in the substitute printing setting storage unit 78. In the print condition editing process, the print server device 12 determines whether the substitute printing function is valid or invalid, from information that can be read from the print data, and when the substitute printing is valid, the print server device 12 specifies the substitute printing person and sets the print restriction (expiration date, number of copies, etc.). The specification of the substitute printing person and the setting of the print restriction are reflected in the print job information. The print condition editing unit 75 stores the print job information in the print job information storage unit 77.

Figure 16:
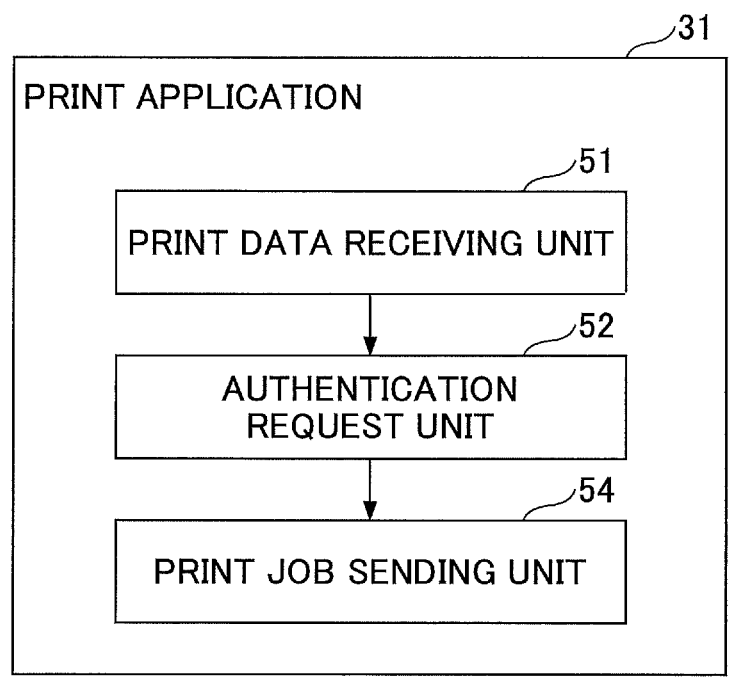
FIG. 16 is a process block diagram of another example of a print application.

The print data receiving unit 51 of the print application 31 of FIG. 16 receives print data of application data for which a request for printing has been made by the user. When the print data receiving unit 51 receives print data, the authentication request unit 52 displays, on the display device 502, an authentication dialog for receiving input of user information such as a user name and a password from the user. Then, the authentication request unit 52 requests the authentication server device 11 to perform authentication by the user information input in the authentication dialog. When the authentication is successful, the print job sending unit 54 uploads the print job including the print data and the print job information, in the print server device 12.

Furthermore, the print job receiving unit 71 in the print server device 12 of FIG. 17 receives a print job uploaded from the client terminal 16. The print job receiving unit 71 stores the print data of the received print job in the print data storage unit 76. Furthermore, the print job receiving unit 71 supplies the print job information of the received print job to the print condition editing unit 75.

The print condition editing unit 75 performs the print condition editing process by using the substitute printing setting stored in the substitute printing setting storage unit 78. In the print condition editing process, the print condition editing unit 75 determines whether the substitute printing function is valid or invalid, from information that can be read from the print data, and when the substitute printing is valid, the print condition editing unit 75 specifies the substitute printing person and sets the print restriction (expiration date, number of copies, etc.). The specification of the substitute printing person and the setting of the print restriction are reflected in the print job information. The print condition editing unit 75 stores the print job information, which has undergone the print condition editing process, in the print job information storage unit 77.

The job list providing unit 72 provides a job list of print jobs that the requesting user can print, to the output device 17. The mail sending unit 73 sends a report by mail to a registered user of a print job printed by a substitute printing person, and sends a report by mail to a substitute printing person of a print job of which the print expiration date is about to expire. The print data providing unit 74 provides print data of a print job selected from a job list by the requesting user, to the output device 17.

<Overview>

The printing system 1 according to the present embodiment can be used in a case where the doctor holds the original data, such as results of a routine medical examination, results of a medical diagnosis, etc., and the patient prints the print data of printed matter to be provided to the patient, by a substitute printing function. The medical institution can reduce costs if the patient himself prints the data from the output device 17 in a convenience store, etc., and can also reduce the surgery hours. Meanwhile, the patent does not need to wait at the hospital until the results of a routine medical examination, results of a medical diagnosis, etc., are output.

In the printing system 1 according to the present embodiment, a print job in which the patient is specified as the substitute printing person is not displayed in the job list displayed by the doctor. Furthermore, in the printing system 1 according to the present embodiment, it is possible to automatically specify a substitute printing person, from among a number of candidate substitute printing persons corresponding to the number of patients. Furthermore, in the printing system 1 according to the present embodiment, it is possible to set the print restriction (expiration date, number of copies, etc.) from the information that can be read from the print data.

As described above, in the printing system 1 according to the present embodiment, it is possible to determine whether the substitute printing function is valid or invalid from the information that can be read from the print data, and automatically specify the substitute printing person and set the print restriction (expiration date, number of copies, etc.), when the substitute printing function is valid.

Note that the present embodiment is described by taking as an example, the substitute printing between a doctor and a patient; however, the application of the present invention is not limited to such an embodiment. In the present embodiment, the relationship between the doctor and the patient corresponds to a relationship between a person instructing the output and a person executing the output.

From this viewpoint, the doctor is a print request instructing person instructing to request printing, and the print request instructing person is an example of an output request instructing person instructing to request output of data. Furthermore, the patient is a print execution allowed person who is specified as a person allowed to execute printing in the print request by the print request instructing person. The print execution allowed person is an example of an output allowed person who is allowed to output the data. Furthermore, not only the patient, but also the doctor (output request instructing person) is a user who can be the output allowed person.

Furthermore, the various users including the doctor and the patient are an output execution instructing person instructing to execute output of data. The output execution instructing person can output the data (output data) of an output request for which the output execution instructing person himself is specified as the output allowed person.

The present invention includes, as functions for specifying the output allowed person, a function for identifying a user to be the output allowed person from the output data, and a function for specifying a user other than the output request instructing person, as the output allowed person. Furthermore, the present invention includes a function of determining whether to include an output request instructing person as the output allowed person, based on the output data.

Furthermore, the present invention includes a function of setting conditions applied when a user (non-instructing person) other than the output request instructing person executes the output. Note that an example of conditions applied at the time of output is the above-described print restriction (expiration date, number of copies, etc.). Furthermore, the condition is not limited to conditions relevant to the output expiration date and the output volume such as the expiration date and the number of copies.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

According to one embodiment of the present invention, an information processing apparatus, an output system, and an output method are provided, which are capable of reducing time-consuming efforts of a user requesting substitute output.

The information processing apparatus, the output system, and the output method are not limited to the specific embodiments described herein, and variations and modifications may be made without departing from the spirit and scope of the present invention. The printing system 1 according to the above embodiment is an example of an output system. The print server device 12 and the client terminal 16 are examples of an information processing apparatus.

The process of steps S31 and S32 performed by the print condition editing unit 53 is an example of a process by a substitute output function validity determining unit. The process of step S36 performed by the print condition editing unit 53 is an example of a process by a substitute output person specifying unit. The print job sending unit 54 is an example of a sending unit. The print job information is an example of output-data-related-information.

The substitute printing person is an example of a substitute output person. The client terminal 16 is an example of a terminal device. The substitute printing setting is an example of a substitute output setting. The print restriction is an example of an output restriction.

The present application is based on and claims the benefit of priority of Japanese Priority Patent Application No. 2015-054361, filed on Mar. 18, 2015, the entire contents of which are hereby incorporated herein by reference.

What is claimed is:

1. An information processing apparatus for storing output data in a storage unit, in an output system in which an output device acquires and outputs the output data stored in the storage unit, the information processing apparatus comprising:
a substitute output function validity determining unit configured to determine whether a substitute output function is to be valid for the output data, based on information read from the output data, by using a substitute output setting having set therein the information that can be read from the output data for which the substitute output function is to be valid; and
a substitute output person specifying unit configured to specify a substitute output person, based on the information that can be read from the output data, and reflect information of the specified substitute output person in output-data-related-information relating to the output data that is stored together with the output data in the storage unit, when the substitute output function validity determining unit determines that the substitute output function should be valid for the output data.

2. The information processing apparatus according to claim 1, wherein
the substitute output person specifying unit determines whether output of the output data is allowed for the substitute output person as well as a user who stored the output data in the storage unit, based on the information read from the output data, by using the substitute output setting having set therein the information that can be read from the output data that the substitute output person as well as the user are allowed to output, and when the substitute output person specifying unit determines that the output of the output data is not allowed for the substitute output person as well as the user, the substitute output person specifying unit reflects a setting that the output is not allowed for the substitute output person as well as the user, in the output-data-related-information.

3. The information processing apparatus according to claim 2, wherein
when the substitute output person specifying unit determines that the output of the output data is allowed for the substitute output person as well as the user, the substitute output person specifying unit reflects a setting that the output is allowed for the substitute output person as well as the user, in the output-data-related-information.

4. The information processing apparatus according to claim 1, wherein
the substitute output person specifying unit determines whether an output restriction is to be set for the output data, based on the information read from the output data, by using the substitute output setting having set therein the information that can be read from the output data for which the output restriction is to be set, and
when the substitute output person specifying unit determines that the output restriction is to be set for the output data, the substitute output person specifying unit reflects a setting of the output restriction in the output-data-related-information.

5. The information processing apparatus according to claim 1, further comprising:
a sending unit configured to send the output data and the output-data-related-information, such that the output data and the output-data-related-information are stored in the storage unit or in a different storage unit, depending on whether the substitute output function validity determining unit determines that the substitute output function should be valid for the output data or the substitute output function validity determining unit does not determine that the substitute output function should be valid for the output data.

6. An output system including a terminal device configured to send output data to be stored in a storage unit, and at least one information processing apparatus configured to provide, to an output device, the output data sent from the terminal device and stored in the storage unit, and cause the output device to output the output data, the output system comprising:
a substitute output function validity determining unit configured to determine whether a substitute output function is to be valid for the output data, based on information read from the output data, by using a substitute output setting having set therein the information that can be read from the output data for which the substitute output function is to be valid; and
a substitute output person specifying unit configured to specify a substitute output person, based on the information that can be read from the output data, and reflect information of the specified substitute output person in output-data-related-information relating to the output data that is stored together with the output data in the storage unit, when the substitute output function validity determining unit determines that the substitute output function should be valid for the output data.

7. The output system according to claim 6, wherein
the substitute output person specifying unit determines whether output of the output data is allowed for the substitute output person as well as a user who stored the output data in the storage unit, based on the information read from the output data, by using the substitute output setting having set therein the information that can be read from the output data that the substitute output person as well as the user are allowed to output, and
when the substitute output person specifying unit determines that the output of the output data is not allowed for the substitute output person as well as the user, the substitute output person specifying unit reflects a setting that the output is not allowed for the substitute output person as well as the user, in the output-data-related-information.

8. The output system according to claim 7, wherein
when the substitute output person specifying unit determines that the output of the output data is allowed for the substitute output person as well as the user, the substitute output person specifying unit reflects a setting that the output is allowed for the substitute output person as well as the user, in the output-data-related-information.

9. The output system according to claim 6, wherein
the substitute output person specifying unit determines whether an output restriction is to be set for the output data, based on the information read from the output data, by using the substitute output setting having set therein the information that can be read from the output data for which the output restriction is to be set, and
when the substitute output person specifying unit determines that the output restriction is to be set for the output data, the substitute output person specifying unit reflects a setting of the output restriction in the output-data-related-information.

10. The output system according to claim 6, further comprising:
a sending unit configured to send the output data and the output-data-related-information, such that the output data and the output-data-related-information are stored in the storage unit or in a different storage unit, depending on whether the substitute output function validity determining unit determines that the substitute output function should be valid for the output data or the substitute output function validity determining unit does not determine that the substitute output function should be valid for the output data.

11. An output method executed in an output system including a terminal device configured to send output data to be stored in a storage unit, and at least one information processing apparatus configured to provide, to an output device, the output data sent from the terminal device and stored in the storage unit, and cause the output device to output the output data, the output method comprising:
determining whether a substitute output function is to be valid for the output data, based on information read from the output data, by using a substitute output setting having set therein the information that can be read from the output data for which the substitute output function is to be valid; and
specifying a substitute output person, based on the information that can be read from the output data, and reflect information of the specified substitute output person in output-data-related-information relating to the output data that is stored together with the output data in the storage unit, when the determination is made that the substitute output function should be valid for the output data.

12. The output method according to claim 11, wherein
the specifying includes determining whether output of the output data is allowed for the substitute output person as well as a user who stored the output data in the storage unit, based on the information read from the output data, by using the substitute output setting having set therein the information that can be read from the output data that the substitute output person as well as the user are allowed to output, and when the determination is made that the output of the output data is not allowed for the substitute output person as well as the user, the specifying includes reflecting a setting that the output is not allowed for the substitute output person as well as the user, in the output-data-related-information.

13. The output method according to claim 12, wherein
when the determination is made that the output of the output data is allowed for the substitute output person as well as the user, the specifying includes reflecting a setting that the output is allowed for the substitute output person as well as the user, in the output-data-related-information.

14. The output method according to claim 11, wherein
the specifying includes determining whether an output restriction is to be set for the output data, based on the information read from the output data, by using the substitute output setting having set therein the information that can be read from the output data for which the output restriction is to be set, and when the determination is made that the output restriction is to be set for the output data, the specifying includes reflecting a setting of the output restriction in the output-data-related-information.

15. The output method according to claim 11, further comprising:

sending the output data and the output-data-related-information, such that the output data and the output-data-related-information are stored in the storage unit or in a different storage unit, depending on whether the determination is made that the substitute output function should be valid for the output data or the determination is not made that the substitute output function should be valid for the output data.

* * * * *